United States Patent
Doi (10) Patent No.: US 8,122,190 B1
(45) Date of Patent: Feb. 21, 2012

(54) METHOD AND SYSTEM FOR RECONFIGURABLE MEMORY-BASED PERMUTATION IMPLEMENTATION

(75) Inventor: Bryan Doi, Queen Creek, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 434 days.

(21) Appl. No.: 12/457,042

(22) Filed: May 29, 2009

(51) Int. Cl.
*G06F 13/00* (2006.01)
*G06F 13/28* (2006.01)

(52) U.S. Cl. .................. 711/109; 711/170; 711/E12.002
(58) Field of Classification Search .................. 711/109, 711/170, E12.002
See application file for complete search history.

(56) References Cited

U.S. PATENT DOCUMENTS

| | | | | |
|---|---|---|---|---|
| 7,639,798 B1 * | 12/2009 | Bortz et al. | ...................... | 380/28 |
| 2006/0171532 A1 * | 8/2006 | Iketani et al. | ................... | 380/28 |
| 2007/0043982 A1 * | 2/2007 | Arivoli et al. | ................. | 714/701 |
| 2009/0254718 A1 * | 10/2009 | Biscondi et al. | .............. | 711/154 |
| 2010/0281340 A1 * | 11/2010 | Franceschini et al. | ........ | 714/763 |

* cited by examiner

*Primary Examiner* — Ly D Pham
(74) *Attorney, Agent, or Firm* — Davidson Berquist Jackson & Gowdey, LLP

(57) ABSTRACT

Memory-based permutation methods and systems are provided for the permutation of data. The memory-based permutation methods and systems provide flexibility and reconfigurability while reducing size and increasing speed. They provide the ability to program a memory, such as a Random Access Memory (RAM), to implement a permutation of source data. The RAM may be reprogrammed to change the permutation pattern thereby providing the flexibility to implement any pattern of permutation from source data to output data and the reconfigurability to change that implementation as desired. Also, the size of the RAM is greatly reduced, and as the input and output data width and number of input and output data bits increase, the size and complexity of the RAM does not increase greatly or exponentially, as with typical conventional systems.

15 Claims, 7 Drawing Sheets

METHOD AND SYSTEM FOR RECONFIGURABLE MEMORY-BASED PERMUTATION IMPLEMENTATION

This generally relates to permutation of data and more particularly to reconfigurable memory-based permutation of data.

BACKGROUND

The rapid growth in Internet usage has increased the dependency on information stored and communicated by businesses and individuals. In particular, growth in DSL and cable modem usage by consumers and businesses and increased business-to-business Internet activity have contributed to this dependency. As the desire for confidentiality, authenticity, and integrity increases, an increasing proportion of this information is sent in secure or encrypted form. Also, an increasing proportion of electronic communication will occur at increasingly fast speeds.

Secure communications are desirable for sensitive activities like on-line financial transactions or the transmission of personal medical information, but can require significantly increased processing demands at both ends of a communications session. This processing demand is further increased as communication bandwidth improves and increases the volume of data for security processing. As the demand for secure Internet communication increases, security processing needs consume ever increasing proportions of the available central processing capability of communications network servers.

In secure Internet communication, for example, Internet Protocol (IP) communication servers encrypt, decrypt, sign and authenticate inbound and outbound data packets to accomplish typical IP communication. Cryptographic processors and other devices accomplish or share some of the cryptographic processing load such as the encrypting, decrypting and authenticating of data packets.

Many encryption algorithms utilize the ability to permute or mix incoming data by remapping the data to the output, thereby changing the data orientation. Used to scramble data, permutation takes an input data pattern of 1's and 0's, for example, and switches the position of those bits of information for output. The permutation can map a single input signal to a single output, multiple outputs or no outputs, and the output location(s) of this mapping can be any location(s) within the output data word.

Figure 1:
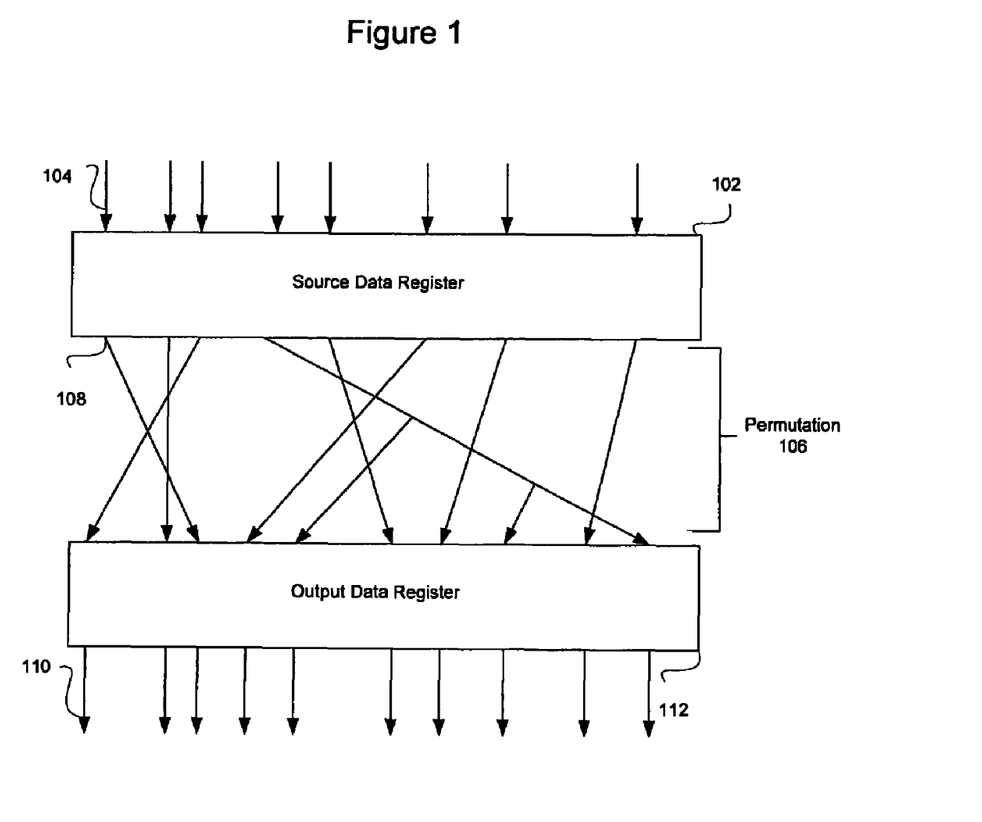
FIG. 1 illustrates an example of a data mapping of a permutation.

FIG. 1 depicts an example of a data mapping of a permutation. As shown in the Figure, a source data register 102 includes incoming input signals 104 to be permuted, and the permutation 106 maps the signals of the source data register 108 to different outputs 110 in the output data register 112. Any one of the input signals 104 can be mapped to go to any one or more, or none of the outputs 110 on the output data register 112. For simplicity, numerals on the Figure are shown on only one of each component, e.g., inputs 104, outputs 110.

One conventional implementation utilizes a multiplexer architecture, an array of multiplexers, that allows any input bit location to map to any other output bit location as well as any multiple output bit locations. While direct, the multiplexer approach results in a routing intensive implementation and shifts the requirement for flexibility and reconfiguration to the control logic which controls the multiplexers. Additionally, implementations using multiplexers quickly grow as the input source data width increases. As the size of the array grows to support a wider input source data width and more input bits, the number of signal lines and control lines increases. Furthermore, the capacitive and resistive loading on both input bit signal lines and control lines increases in order to support the larger interconnect structure of the multiplex inputs and outputs. Increased capacitive and resistive loading affects the overall speed, i.e., the delay from source data to output data, of the multiplexer permuter. The increase in the physical size of the multiplexer implementation consumes silicon area and complicates the control logic function to allow the implementation of the permutation. Routing of the various control and signals increases the complexity of routing the permutation block, increasing the overall silicon area consumed and thereby the overall cost of the implementation.

Figure 2:
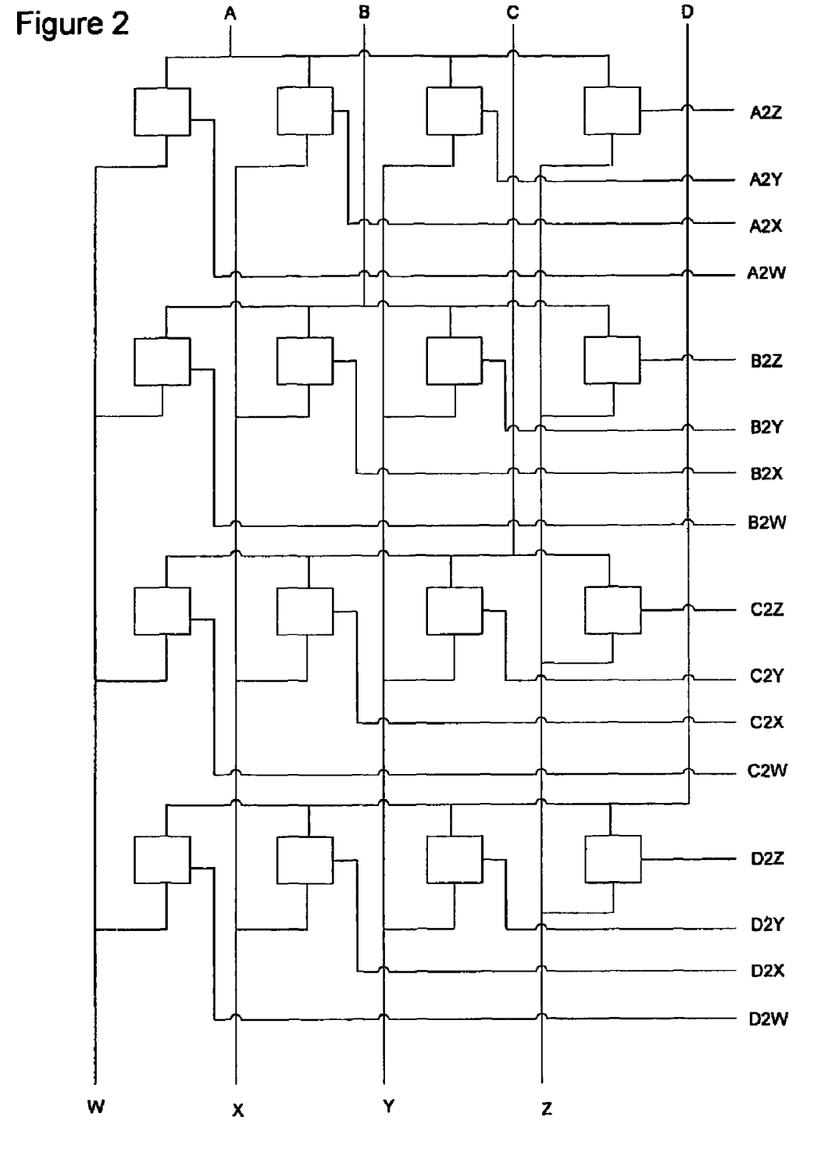
FIG. 2 depicts an exemplary conventional multiplexer.

FIG. 2 depicts an exemplary conventional multiplexer. As shown on the Figure, the multiplexer has input lines A, B, C, and D which each input a single bit of data, and output lines W, X, Y, and Z which output a single bit of data. It also has control lines for each combination of input-to-output line pairing, A2W, A2X, A2Y, BZ, B2W, B2X, B2Y, B2Z, C2W, C2X, C2Y, C2Z, D2W, D2X, D2Y, and D2Z. As can be seen, an increase in the number of input and output lines greatly increases the number of control lines. In this implementation, in addition to providing the control lines A2W-D2Z, control logic (not shown) is needed to govern the control lines to steer the data bits appropriately. One drawback is that a control line and associated control logic is needed for every possible combination of input and output lines that data can be steered to and from, which grows quickly as the input data word width grows. On FIG. 2, an addition of a single input line and output line increases the number of control lines by 16. The addition of yet another single input line and output line increases the number of control lines by another 32 lines, for a total increase of 48 lines. Furthermore, changing the control logic to map the input bits to output bits becomes increasingly complicated.

Accordingly, there is a desire to avoid the complexity, size, inflexibility and reduced speed of conventional permutation implementations. Methods and systems are desired to avoid these and other related problems.

SUMMARY

In accordance with methods and systems consistent with the present invention, a reconfigurable memory-based permuter is provided comprising an input configured to receive source data to be permuted, and a memory configured to store permutation data indicating a permutation to perform on the received source data. The permuter also comprises an output configured to output permuted output data resulting from permuting the source data according to the stored permutation data.

In one implementation, a method in a reconfigurable memory-based permuter is provided that receives source data to be permuted, and stores permutation data in a memory, the permutation data indicating a permutation to perform on the received source data. The method also inputs the source data into the memory storing the permutation data, and outputs permuted output data resulting from permuting the source data according to the stored permutation data.

In another implementation, a method in a reconfigurable parallel memory-based permuter is provided that receives source data to be permuted, and divides the received source data into multiple portions of the source data. The method also stores permutation data in multiple memories, the permutation data indicating a permutation to perform on the received source data. It further provides each of the multiple portions of source data to one of multiple memories, each memory configured to store permutation data indicating a permutation to perform on the received portion of source data, and outputs from each memory the permutation data corresponding to the input portion of source data. Finally, the method combines the outputted permutation data from each memory, and outputs the combined permutation data.

DETAILED DESCRIPTION

Methods and systems in accordance with the present invention utilize a memory-based permutation approach to provide flexibility and reconfigurability while reducing size and increasing speed. They provide the ability to program a memory, such as a Random Access Memory (RAM), to implement the permutation. The RAM may be easily reprogrammed to change the permutation pattern thereby providing the flexibility to implement any pattern of permutation from source data to output data and the reconfigurability to change that implementation as desired. The system allows a designer to build one permuter and reprogram the RAM in the permuter by writing a new data pattern into the memory, thereby changing the permutation algorithm in the device. Also, the size of the RAM is greatly reduced, and as the input and output data width and number of input and output data bits increase, the size of the RAM does not increase greatly or exponentially. The use of a memory for permutation provides easy reprogrammability and implementation size reduction.

Various embodiments of methods and system consistent with the present invention avoid large RAM space using various implementation methods described below. In one embodiment, a serial implementation is described, and in another embodiment a parallel implementation is described. Both implementations greatly reduce the RAM size required for permutation.

Without these approaches, a straight-forward memory-based approach may dictate that the address lines of the RAM would equal the width of the source data word, and the RAM output width would match the output data width, wherein each memory address location includes a mapping of the input bits to the output bits. However, using a direct application of a RAM could also quickly result in a very large block of RAM that increases as the number of input bits and address lines increase. Potentially, this RAM would be beyond the capability of current memories compilers. For example, a 64-bit wide input word and 64-bit wide output data word would yield an extremely large memory of $2^{64} \times 64$ bits, i.e., the number of possible memory location addresses that correspond to a 64-bit input address times the 64-bit size in each location, the mapping of the input bits to the output in that particular address. This RAM would be beyond the capability of current memory compilers. Even if the size were reduced to the limits of current compiler and silicon technology, large RAM sizes have other drawbacks including, for example, an increase in soft error rate, negative impact on manufacturing yield (as array sizes increase, the likelihood of a defect in the memory while manufacturing increases), and performance problems.

To counter these problems, a serialized architecture can reduce the memory area required at some expense of latency. The serial implementation reduces RAM size by using a shift register to load the input bits in serially. As described below, in this implementation, the RAM size is 128 ($2^7$ memory locations)×64 bits (size of each memory location), which is 8,192 bits.

In the parallel implementation, methods and systems in accordance with the present invention avoid large RAM requirements by breaking source data into smaller sub-sections processed by separate smaller RAMs. For example, a 64-bit wide source data word may be broken down into, for example, two 32-bit words, or four 16-bit words or eight 8-bit words. By reducing the source data width being applied to each RAM, the overall RAM size is reduced. For example, in the 64-bit scenario, 8-bit words used as address inputs to the RAM result in 8 RAM's, each of 16,384 bits, resulting in a total of 131,072 bits, as opposed to $2^{70}$ bits ($2^{64} \times 64$ bits as described above).

Figure 3:
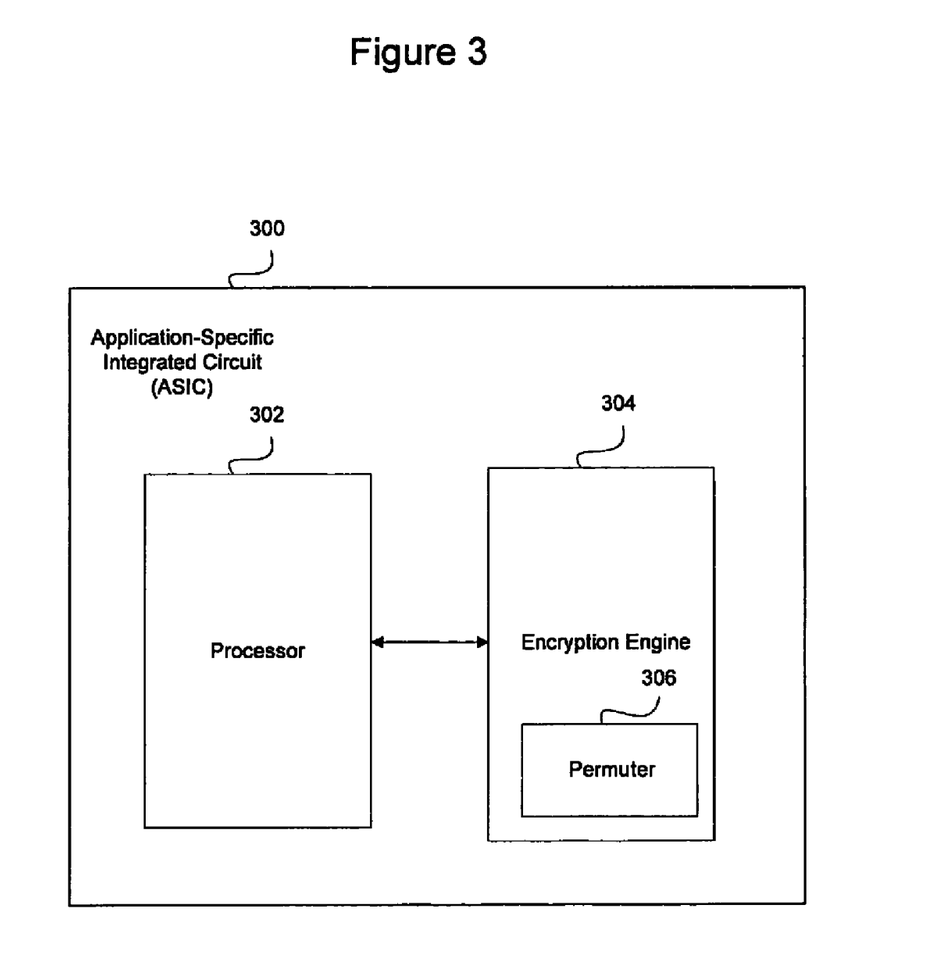
FIG. 3 illustrates an exemplary ASIC including an exemplary encryption engine having a permuter in accordance methods and systems consistent with the present invention.

FIG. 3 illustrates an exemplary ASIC including an exemplary encryption engine having a permuter 306 in accordance methods and systems consistent with the present invention. The encryption engine 304 may be in an ASIC 300 that performs, for example, network processing, and may reside in a cryptographic core (not shown) on the ASIC. Alternatively, it may be implemented in a field-programmable gate array (FPGA), or may be implemented in any other suitable manner. The data stream input to the encryption engine 304 may come from, for example, a network processor 302 that receives data from the Internet, and the encryption engine returns its output data stream to the processor or other component(s). The permuter 306 operates inside the encryption engine 304 to implement permutations on data, and is invoked by the encryption algorithm used by the encryption engine. The permuter 306 may also reside outside of the encryption engine 304 and may also operate in any other suitable environment.

Figure 4:
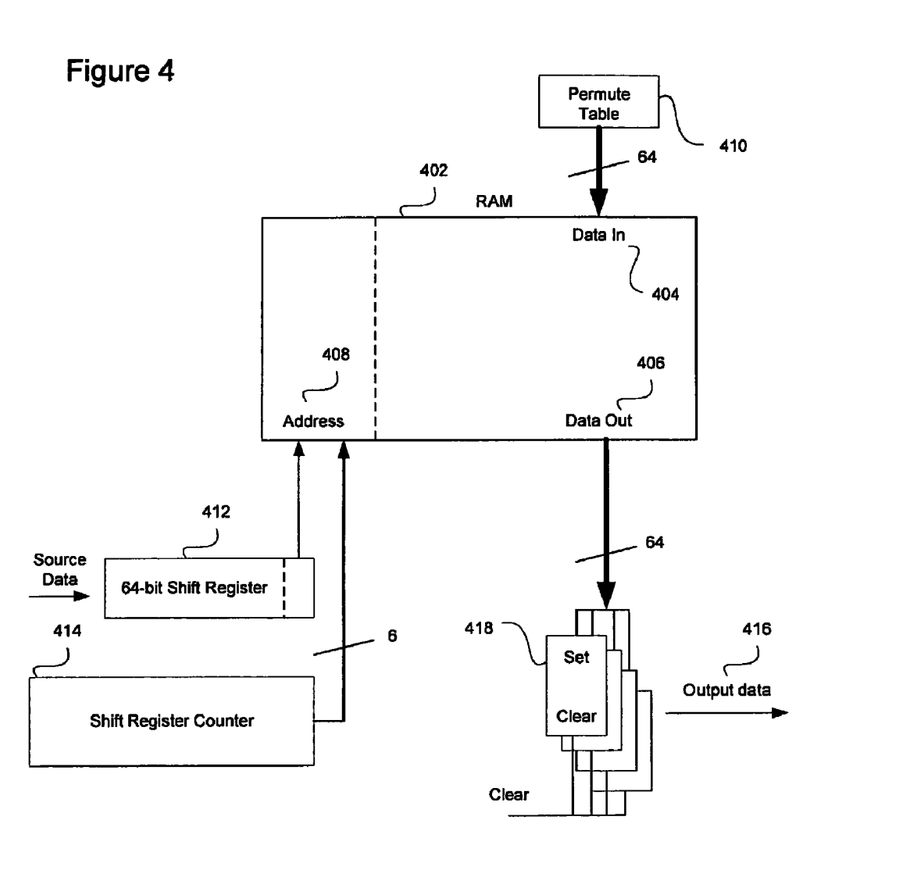
FIG. 4 depicts an example of a serial permutation implementation in accordance with methods and systems consistent with the present invention.

FIG. 4 depicts an example of a serial permutation implementation in accordance methods and systems consistent with the present invention. FIG. 4 shows a RAM 402 having a data input 404, a data output 406, and input address lines 408. In this exemplary RAM 402, both the data input 404 and the data output 406 are 64-bits wide, and the address lines 408 are 7-bits wide. Data that goes into the RAM 402 through the data input 404 enters a location selected by the 7-bit address lines 408, and hence there are 128 different data locations. The location of data exiting the RAM 402 is also selected by the address specified on the address lines 408. For example, if the address lines 408 receive address 0000000, the first location is selected, and the data in that location is accessed. If they are 0000001, the second address location is selected and the data in that location is accessed, and so forth. In one implementation, the data in each location comprises 64-bits of information. However, the number of address lines 408, RAM size and memory location size may vary.

Also shown is a permutation table 410 which is the data entered into the RAM that directs the permutation. These 64-bits of data in each location of the RAM 402 indicate how the input data word is permuted to the output. In each one of the RAM address locations, there are 64 bits of data in that address that come from the permutation table 410. This permutation table 410 is written depending on how the data is to be mapped, and represents the actual mapping of the information. The permutation table 410 can be reprogrammed and reloaded into the RAM 402 to easily change the permutation algorithm. In one implementation, the permutation table 410 is generated in a separate hardware component and stored in a memory, and a processor (not shown) loads the permutation table 410 into the RAM 402. The permutation table 410 can be generated in software on a personal computer.

The RAM 402 uses the address lines 408 as input for the source data. The shift register 412 loads and contains the input source data word to be permuted into an output data format. In this exemplary serial implementation, a 64-bit shift register 412 loads the source data into one address line, one bit at a time in this example. The shift register 412 loads one bit at a time, and then once the bits are read, they are discarded. In this implementation example, the source data is 64-bits wide and is being permuted into a different 64-bit wide output configuration. A 6-bit wide shift register counter 414 counts of which bit of the source data is being loaded. For example, it starts at 000000 for the first bit, goes to 000001 for the second bit, and 000010 for the third bit, etc.

The data output 408 bit locations are used to set bit locations in the output data register 416 to accomplish the permutation. The output bits go to a set/reset flip-flop 418 in the output data registers 416. The set/reset flip-flop 418 starts at 0 when initially cleared, and gets set to 1 upon the receipt of a 1 bit, and stays at 1 until cleared again regardless of whether subsequent inputs are 1 or 0. When the process begins, the output data register 416 is initially cleared, and when the process is complete, the bit settings in the output data registers 416 represent the permutation of the original 64-bit input source data word.

Figure 5:
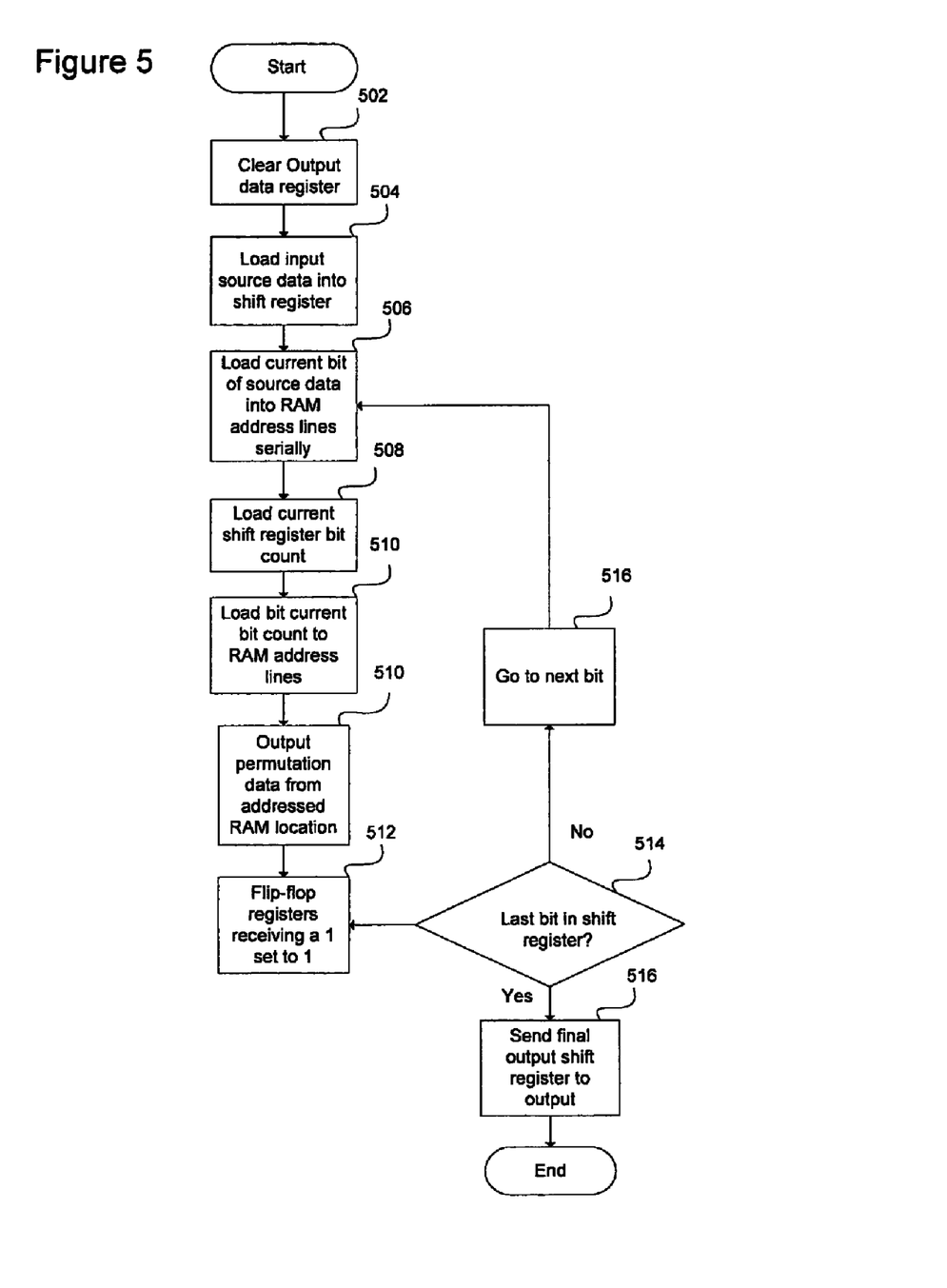
FIG. 5 represents a flowchart showing steps of a method for serial memory-based permutation in accordance with methods and systems in accordance with the present invention.

FIG. 5 represents a flowchart showing steps of a method for serial memory-based permutation in accordance with methods and systems in accordance with the present invention. The method is described in conjunction with the components shown on FIG. 4.

First, the output data register 416 is initially cleared (step 502), i.e., set to all 0's. The input source data word is loaded into the shift register (step 504) and presented serially to the address lines 408 through the shift register 412 one at a time (step 506). The shift register counter 414 keeps track of which bit in the shift register 412 is being input to the RAM 402, and supplies the bit count to the address lines 408 (step 508). The total resulting address supplied to the RAM 402 is the current bit in the supplied input data source word and its associated count, which in this example is 7 bits (step 510). If the input source data word started with a 1, then the associated address supplied to the RAM 402 may be 1000000. If the second bit in the input source data word is also a 1, then the second address supplied to the RAM 402 is 1000001. Further, if the third bit in the input data word was a 0, then the third address supplied to the RAM 402 would be 0000010. This would continue until the shift register count (the last 6 bits) had gone to 64, and 64 addresses had been supplied to the RAM 402.

The data in each addressed RAM location contains the permutation of the source data for that particular bit. The permutation data held in the RAM contents maps that particular bit location to the output data register 416 as either a 1, i.e., set, or a 0, i.e., ignore. The 64-bit permutation data represents an output data pattern that represents where the bit is supposed to go. Generally, the permutation data is used to analyze the location of 1's in the source data and determines which output locations would receive that 1, and the data in the corresponding RAM 402 location contains the mapping that indicates the output locations for that bit. For example, if a certain bit in the source data word is supposed to be mapped to three different locations, the corresponding 64-bit permutation data in the RAM address supplied for that bit would have a 64-bit data word having sixty-one 0's and three 1's in locations corresponding to where the source data word bit is supposed to go to. If the first input bit 1 is supposed to go to locations 1, 4 and 7, but none of the other 64 locations, the permutation data at its RAM address location (1000000 as shown above) may be 10001001 followed by 56 zeros. That is, there are 1's corresponding to where the bit is supposed to go. As another example, if that bit is a 0 and it is not being mapped to any locations, the permutation data in the corresponding RAM location would contain all 0's. If a particular bit was to be mapped to all of the available outputs, the permutation data would contain all 1's.

The data word in that data location goes to the output flip-flop registers 418 (step 512). A bit is set in any given flip-flop register 418 that receives a 1 from the associated output (step 514). Any flip-flop register 418 that has a 1 stays at 1 through the iterations of the rest of the shift register 412 until all 64 bits have been entered into the address lines 408 and it is cleared at the beginning of the next data input word. In one implementation, the flip-flop registers 418 can be turned from 0's to 1's upon receipt of a 1 at the output, but receipt of a 0 at the data output 406 will not turn a 1 in the flip-flop register 418 back into a 0.

If the last bit in the shift register 412 is not reached (step 516), the process continues to the next bit and repeats by loading the next bit address into the address lines 408 (step 518). As the shift register counter 414 points to a different RAM address location for each of the shift register bits, the data at the location shows how that bit will be permuted to any one of the 64 outputs.

In one implementation, a 0 at the input by default represents an bit to ignore. Logic may be added to the source data shift register 412 and shift register counter 414 that allows for source data 0 values to be skipped by using a look-ahead scheme. However, this makes the time for the permutation to occur irregular. In this case, the time to permute the input data is at worst 64 clock cycles. Also, note that the RAM size is 128×64, since each bit is mapped to 2 possible RAM data locations, one for a 1 and another for a 0. That is, at any given shift register count location, there are two different possible shift register bits, a 0 or a 1. If compression is desired, RAM data can be composed of only the 64-bit set information, and any 0 from the source data shift register 412 is ignored by the RAM 402, i.e., by using the source data bit as a RAM enable, thereby further reducing the RAM area to 64×64.

A similar approach can be used if the source data is presented 2 bits at a time. In this case, the 2 bits presented represent 4 possible data locations for each shift register count location. One of these is 00, which can be ignored, while the others, 01, 10, and 11, are required and cannot be effectively compressed. Here, the shift register counter 414 is 5 bits (32 shifts of 2-bit locations each), and 2 bits of source data which results in a RAM 402 of 128×64. If we use 4 bits of source data, the shift register counter 414 is 4 bits and the RAM 402 is 256×64. Using 8 bits of source data with 3 bits of shift register counter 414 results in a 2048×64 RAM 402. In this way, latency can be reduced at the cost of memory size.

Figure 6:
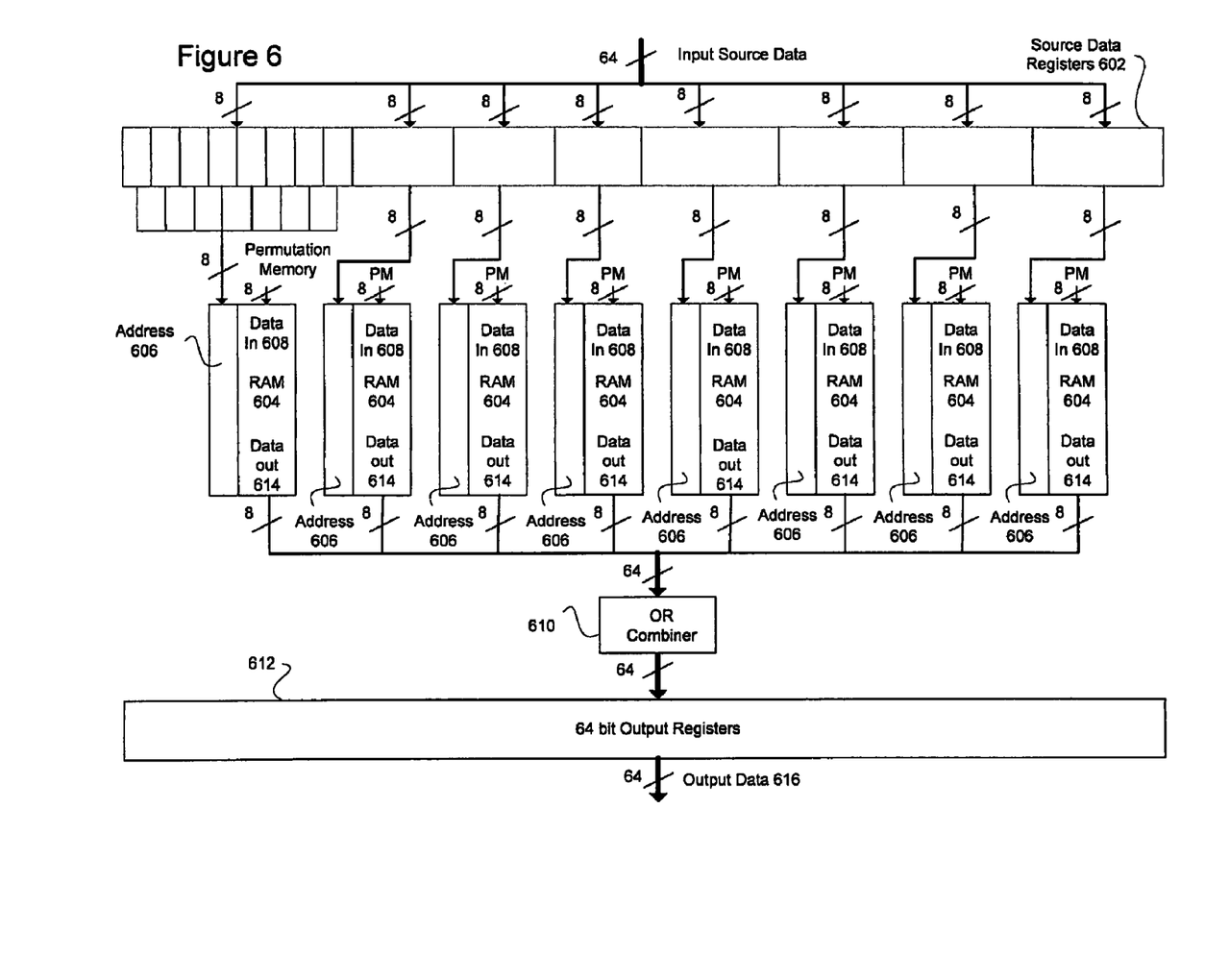
FIG. 6 illustrates a parallel permutation implementation in accordance with methods and systems consistent with the present invention.

FIG. 6 illustrates a parallel permutation implementation in accordance with the present invention. If latency reduction to a minimum is required, a parallel memory-based structure can be utilized. In this scenario, eight separate RAM's 604 contain the permutation data, and 64-bit source data is input into source data registers 602. As shown on the Figure, each RAM 604 accepts 8 bits into its address lines 606 (resulting in 256 memory locations), 64 bits into its data input 608 and outputs 64 bits to the output 614. This results in 8 RAM's of 256×64 bits each. As before, the data-in port for each RAM 604 receives permutation data from a permutation table (not shown on this Figure but similar to the permutation table 410 on FIG. 4). There is also an OR combiner 610 that combines the outputs 614 of the RAM's 604 to output a result to the output data registers 612.

Figure 7:
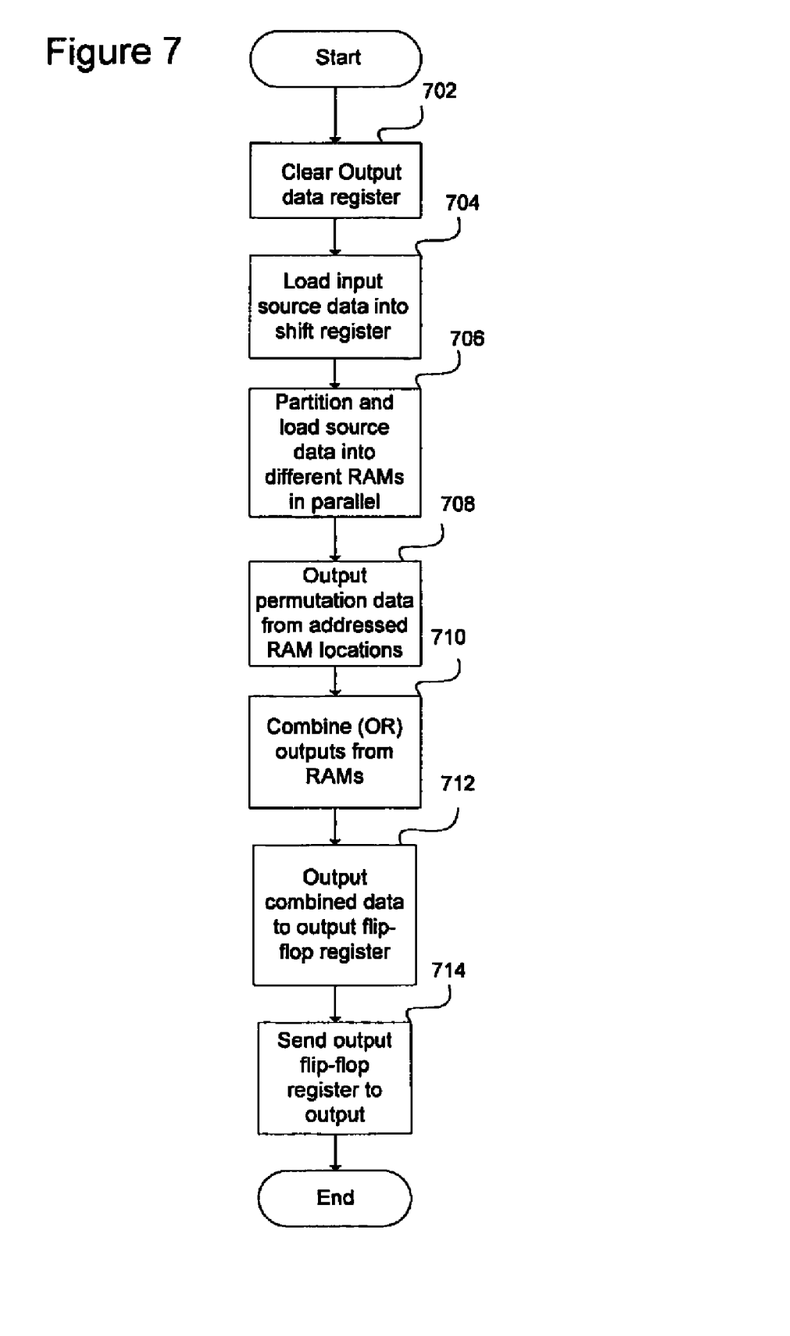
FIG. 7 represents a flowchart showing steps of a method for parallel memory-based permutation in accordance with methods and systems in consistent with the present invention.

FIG. 7 represents a flowchart showing steps of a method for parallel memory-based permutation in accordance with methods and systems in accordance with the present invention. In a parallel implementation, a shift register 412 is not used which reduces latency from potentially sixty-four clock cycles to three clock cycles, i.e., one clock cycle to load the source register 602, one clock to read the RAM 604, and one clock to load the output 616. Again, the output registers 612 are cleared at the beginning (step 702), and the input data source word is loaded into the source data registers 602 (step 704). In this case, the input data source word is 64 bits which are loaded into the 64 source data registers 602. In this scenario, the input source data word is partitioned into 8 sections, and each section is used as an address input to an individual RAM 604 (step 706). The addressed locations in each RAM 604 have 64 bits from its corresponding permutation table to dictate where the corresponding input is to go. The data in the addressed location is outputted at the RAM's data-out port (step 708) and combined (OR'd) by the OR combiner 610 with the outputs from the other RAMs 604 to go to the output data registers 612 (step 710). Given the usage of the OR function, the output registers of the RAM 604 should be synchronous to avoid inadvertently setting the output register bits 612.

In this case, the permutation tables that get stored in each RAM 604 are not the same. Each RAM 604 has a different permutation table since they correspond to only 8 incoming bits of the input data source word. The permutation table in each RAM 604 is different and corresponds to only the specific 8 bits of the input source data word that are input to that RAM. This requires significantly less memory with eight address lines than if it was not broken into different individual RAM's.

In one implementation, because a one-to-many mapping may exist for any given input source register 602, all 64 bits are outputted out of each RAM 604. For example, the far left bit in the input source register 602 could map to the far right bit in the output data register 612. Since the permutation implementation will allow that or any other path to occur, 64 bits are output out of each RAM 604. The outputs from each RAM 604 are combined in the OR combiner 610, i.e., any 1 from any of the RAM's will be a 1 in the output register, regardless of how many 1's were outputted from different RAM's for that location in the output register 612, and a 0 will only exist if all 8 RAM's outputted a zero for that register. In one implementation, the permutation tables corresponding to each RAM 604 are programmed such that there are no multiple outputs from the RAM's 604 setting the same output register bit to a 1. The output from the OR function for all 64 bits is written directly into the output register 612 (step 712) and outputted (step 714).

The foregoing description of preferred embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A reconfigurable memory-based permuter, comprising:
   an input configured to receive source data to be permuted;
   a memory configured to store permutation data indicating a permutation to perform on the received source data, wherein the memory has address lines, and the source data is supplied to the address lines of the memory; and
   an output configured to output permuted output data resulting from permuting the source data according to the stored permutation data.

2. The permuter of claim 1, wherein the memory is a Random Access Memory (RAM).

3. The permuter of claim 1, wherein the source data supplied to the address lines accesses memory locations having permutation data, and the permutation data is sent to the output.

4. The permuter of claim 1, wherein the source data is supplied to the address lines serially.

5. The permuter of claim 4, further comprising a shift register receiving the source data, and a shift register counter counting the source data as the source data is input to the address lines of the memory.

6. The permuter of claim 1, wherein the output comprises output registers, and the permutation data is output the output registers.

7. The permuter of claim 1, wherein the permuter operates in conjunction with an encryption engine.

8. The permuter of claim 7, wherein the permuter is in an encryption engine.

9. A reconfigurable memory-based permuter, comprising:
   an input configured to receive source data to be permuted;
   a memory configured to store permutation data indicating a permutation to perform on the received source data; and
   an output configured to output permuted output data resulting from permuting the source data according to the stored permutation data wherein the output comprises output registers, and the permutation data is output to the output registers, and
   wherein the output registers are binary and set to 1 upon receiving a 1 from the permutation data.

10. A reconfigurable memory-based permuter, comprising:
    an input configured to receive source data to be permuted;
    a memory configured to store permutation data indicating a permutation to perform on the received source data, wherein the permutation data is loaded into the memory from a permutation table; and
    an output configured to output permuted output data resulting from permuting the source data according to the stored permutation data.

11. A method in a reconfigurable memory-based permuter, comprising:
    receiving source data to be permuted;
    storing permutation data in a memory, the permutation data indicating a permutation to perform on the received source data;
    inputting the source data into the memory storing the permutation data; and
    outputting permuted output data resulting from permuting the source data according to the stored permutation data; and inputting the source data to the memory to address a location of the permutation data; and outputting the located permutation data to an output.

12. The method of claim 11, wherein the memory is a Random Access Memory (RAM).

13. The method of claim 11, further comprising outputting the permuted output data to an encryption engine.

14. A method in a reconfigurable parallel memory-based permuter, comprising:
   receiving source data to be permuted;
   dividing the received source data into multiple portions of the source data;
   storing permutation data in multiple memories, the permutation data indicating a permutation to perform on the received source data;
   providing each of the multiple portions of source data to one of multiple memories, each memory configured to store permutation data indicating a permutation to perform on the received portion of source data;
   outputting from each memory the permutation data corresponding to the input portion of source data;
   combining the outputted permutation data from each memory; and
   outputting the combined permutation data.

15. The method of claim 14, wherein the memories are RAMs.

* * * * *